US010602544B2

(12) United States Patent
Chang et al.

(10) Patent No.: US 10,602,544 B2
(45) Date of Patent: Mar. 24, 2020

(54) METHOD AND APPARATUS FOR DETERMINING CARRIER SENSE THRESHOLD IN WIRELESS COMMUNICATION SYSTEM

(71) Applicants: Samsung Electronics Co., Ltd., Suwon-si, Gyeonggi-do (KR); Seoul National University R&DB Foundation, Seoul (KR)

(72) Inventors: Sang-Hyun Chang, Seoul (KR); Byoung-Hoon Jung, Seoul (KR); Seongwon Kim, Seoul (KR); Youngwook Son, Seoul (KR); Seungmin Yoo, Seoul (KR); Jaehong Yi, Seoul (KR); Sunghyun Choi, Seoul (KR); Soo-Young Jang, Suwon-si (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 15/220,984

(22) Filed: Jul. 27, 2016

(65) Prior Publication Data

US 2017/0055289 A1    Feb. 23, 2017

(30) Foreign Application Priority Data

Aug. 21, 2015  (KR) .................. 10-2015-0118216

(51) Int. Cl.
*H04W 74/08* (2009.01)
*H04W 52/24* (2009.01)
(Continued)

(52) U.S. Cl.
CPC ...... *H04W 74/0816* (2013.01); *H04B 17/318* (2015.01); *H04W 24/02* (2013.01);
(Continued)

(58) Field of Classification Search
CPC ............ H04W 74/0816; H04W 24/02; H04W 52/243; H04W 52/245; H04W 74/0808;
(Continued)

(56) References Cited

U.S. PATENT DOCUMENTS 8,391,374 B2    3/2013 Husted et al.
8,666,319 B2    3/2014 Kloper et al.
(Continued)

FOREIGN PATENT DOCUMENTS

WO    2015/038930 A1    3/2015
WO    2015/112780 A1    7/2015

OTHER PUBLICATIONS

Qiao et al., "Interference Analysis and Transmit Power Control in IEEE 802.11a/h Wireless LANS," IEEE/ACM Transactions on Networking, vol. 15, No. 5, Oct. 2007, pp. 1007-1020 (Year: 2007).*
(Continued)

*Primary Examiner* — Un C Cho
*Assistant Examiner* — Lalita W Pace
(74) *Attorney, Agent, or Firm* — Jefferson IP Law, LLP

(57) ABSTRACT

A $5^{th}$ generation (5G) or a pre-5G communication system to support a higher data transmission rate than a system after a $4^{th}$ generation (4G) communication system such as long-term evolution (LTE) is provided. A method of determining a carrier sense threshold by one source terminal in a wireless communication system is provided. The method includes identifying whether one or more interferer terminals and one or more destination terminals exist for one source terminal, and if the terminals exist, determining a carrier sense threshold of each of the one or more interferer terminals and the one or more destination terminals based on an interference intensity received from the one or more destination terminals and a feedback link margin.

20 Claims, 15 Drawing Sheets

(51) Int. Cl.
*H04B 17/318* (2015.01)
*H04W 24/02* (2009.01)
*H04W 52/26* (2009.01)
*H04W 52/36* (2009.01)

(52) U.S. Cl.
CPC ....... *H04W 52/243* (2013.01); *H04W 52/245* (2013.01); *H04W 74/0808* (2013.01); *H04W 52/262* (2013.01); *H04W 52/367* (2013.01)

(58) Field of Classification Search
CPC . H04W 52/367; H04W 52/262; H04B 17/318
See application file for complete search history.

(56) References Cited

U.S. PATENT DOCUMENTS

| | | | | |
|---|---|---|---|---|
| 9,854,607 | B1* | 12/2017 | Chu | H04W 52/241 |
| 2008/0267079 | A1* | 10/2008 | Mhatre | H04W 74/0808 |
| | | | | 370/248 |
| 2013/0017794 | A1* | 1/2013 | Kloper | H04W 74/0808 |
| | | | | 455/63.1 |
| 2013/0044681 | A1 | 2/2013 | Abraham et al. | |
| 2015/0163824 | A1* | 6/2015 | Krzymien | H04W 28/18 |
| | | | | 370/338 |
| 2015/0319700 | A1* | 11/2015 | Oteri | H04W 52/28 |
| | | | | 455/127.1 |
| 2016/0150534 | A1* | 5/2016 | Kwon | H04W 72/0446 |
| | | | | 370/338 |
| 2016/0227489 | A1* | 8/2016 | Oteri | H04W 74/0808 |
| 2016/0353480 | A1* | 12/2016 | Choi | H04L 43/16 |

OTHER PUBLICATIONS

Graham Smith, DSP Group, Dynamic Sensitivity Control for HEW, doc.: IEEE 802.11-13/1290r1, Nov. 2013.
Graham Smith, DSP Group, Dynamic Sensitivity Control Practical Usage, doc.: IEEE 802.11-14/0779r1, Jul. 2014.
Johan Soder et al., Ericsson AB, UL & DL DSC and TPC MAC simulations, doc.: IEEE 802.11-14/0868r0, Jul. 14, 2014.
John Son and Jin Sam Kwak, Wilus Institute, Further Considerations on Enhanced CCA for 11 ax, doc.: IEEE 802.11-14/0847r1, Jul. 15, 2014.

* cited by examiner

| UPLINK bit: | DIR=up (430) | Color (410) | ID=PBSSID |
|---|---|---|---|
| | 1 bit | 3 bits | 6 bits |

| No UPLINK bit: | Color (420) | ID=PBSSID (Up) or PAID (Down) |
|---|---|---|
| | 3 or 4 bits | 7 or 6 bits |

METHOD AND APPARATUS FOR DETERMINING CARRIER SENSE THRESHOLD IN WIRELESS COMMUNICATION SYSTEM

CROSS-REFERENCE TO RELATED APPLICATION(S)

This application claims the benefit under 35 U.S.C. § 119(a) of a Korean patent application filed on Aug. 21, 2015 in the Korean Intellectual Property Office and assigned Serial number 10-2015-0118216, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) SEOUL NATIONAL UNIVERSITY R&DB FOUNDATION.

TECHNICAL FIELD

The present disclosure relates to a method and an apparatus for determining a carrier sense threshold (CST) in a wireless communication system.

BACKGROUND

In order to meet wireless data traffic demands that have increased after system commercialization, efforts to develop an improved 5$^{th}$ generation (5G) communication system or a pre-5G communication system have been made. For this reason, the 5G communication system or the pre-5G communication system is called a beyond 4$^{th}$ generation (4G) network communication system or a post long term evolution (LTE) system.

In order to achieve a high data transmission rate, an implementation of the 5G communication system in a mm wave band (for example, 60 GHz band) is being considered. In the 5G communication system, technologies such as beamforming, massive multiple input multiple output (MIMO), full dimensional MIMO (FD-MIMO), array antenna, analog beam-forming, and large scale antenna are discussed to mitigate a propagation path loss in the mm Wave band and increase a propagation transmission distance.

The 5G communication system has developed technologies such as an evolved small cell, an advanced small cell, a cloud radio access network (RAN), an ultra-dense network, device to device communication (D2D), a wireless backhaul, a moving network, cooperative communication, coordinated multi-points (CoMP), and interference cancellation to improve the system network.

The 5G system has also developed advanced coding modulation (ACM) schemes such as hybrid frequency-shift keying (FSK) and Feher's quadrature amplitude modulation (FQAM) and sliding window superposition coding (SWSC), and advanced access technologies such as filter bank multi carrier (FBMC), non-orthogonal multiple access (NOMA), and sparse code multiple access (SCMA).

Sn Institute of Electrical and Electronics Engineers (IEEE) 802.11 standard-based wireless local area network (LAN) system or Wi-Fi uses a carrier sense multiple access/collision awareness (CSMA/CA) scheme in which terminals distributively determine whether channels are occupied and access the channels. Carrier sense (CS) of Wi-Fi includes two types such as clear channel assessment (CCA) and network allocation vector (NAV) that operate independently and simultaneously.

The CCA type corresponds to a CS type of a physical layer (PHY layer) in which a signal is detected based on a strength of a signal received by a wireless device (wireless interface), and the NAV type corresponds to a logical and virtual CS type in which a channel is pre-occupied for a particular time based on information included in a previously received signal.

The CCA type is sub-divided into a CS type (or "CCA-signal detection (SD)") and an energy detection (ED) type (or "CCA-ED").

In the CS type, when a preamble of a Wi-Fi signal determined to detect and receive the Wi-Fi signal is received with a signal strength larger than or equal to an SD threshold, a channel having a length corresponding to the signal is determined to be in a busy state and transmission thereof is postponed.

In the ED type, when a signal that is not the Wi-Fi signal is received with a particular signal strength or larger (e.g., a minimum receivable signal strength of +20 dB), a channel is determined to be in a busy state.

The two types also operate simultaneously and, hereinafter, the CCA disclosed in the specification is limited to the CCA of the CS type and the expression carrier sense threshold (CST) is used instead of the SD threshold.

An interferer terminal disclosed in the specification refers to a transmission node of a Wi-Fi interferer, and a destination terminal refers to a reception node of a signal which a node (source terminal) to access a channel desires to transmit.

In the CCA defined in the general IEEE 802.11 standard, the CST is used which is irrelevant to the transmission terminal (interferer terminal) of the received Wi-Fi interference signal and the reception terminal (destination terminal) of the signal which the terminal (source terminal), intending to access the channel, desires to transmit. A value of the CST is configured as about −82 dBm and a strength of the interference signal in an adjacent cell overlapping basic service set (OBSS) is generally larger than the value (about −82 dBm). Accordingly, when the OBSS performs transmission, transmission in a current BSS (MYBSS) is postponed.

However, even though simultaneous transmission is performed in a state where relative positions of the interferer terminal, the source terminal, and the destination terminal or signal strengths have interference from the OBSS, the signals may be successfully received. In this case, the simultaneous transmission cannot be performed through a fixed CST value, thereby resulting in not sufficiently reusing frequencies.

In this case, if the CST is unilaterally decreased to increase the reuse of the frequencies, the transmission is performed in a condition where simultaneous transmission is not possible, so that collision between signals occurs. In addition, since a signal of the MYBSS is not distinguished, the signal from itself may not be received.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for increasing frequency reuse and reducing frequency resources wasted by unnecessary transmission by adaptively controlling a carrier sense threshold (CST) according to a destination terminal and an interferer terminal by a source terminal in an environment where the destination terminal and the interferer terminal exist in various positions.

In accordance with an aspect of the present disclosure, a method of determining a CST by one source terminal in a wireless communication system is provided. The method includes identifying whether one or more interferer terminals and one or more destination terminals exist for one source terminal, and when the terminals exist, determining a CST of each of the one or more interferer terminals and the one or more destination terminals based on an interference intensity received from the one or more destination terminals and a feedback link margin.

In accordance with another aspect of the present disclosure, an apparatus for determining a CST by one source terminal in a wireless communication system is provided. The apparatus includes a controller configured to identify whether one or more interferer terminals and one or more destination terminals exist for one source terminal, and determine, when the terminals exist, a CST of each of the one or more interferer terminals and the one or more destination terminals based on an interference intensity received from the one or more destination terminals and a feedback link margin.

In accordance with another aspect of the present disclosure, a method of determining a CST by one destination terminal in a wireless communication system is provided. The method includes receive, when one or more interferer terminals and one or more destination terminals exist for one source terminal, receiving a transmission power control (TPC) request from the source terminal, calculating a link margin for calculating a CST, and transmitting a TPC report frame including the CST to the one source terminal.

In accordance with another aspect of the present disclosure, an apparatus for determining a CST by one source terminal in a wireless communication system is provided. The apparatus includes a receiver configured to receive, when one or more interferer terminals and one or more destination terminals exist for one source terminal, a TPC request from the source terminal, a controller configured to calculate a link margin for calculating a CST, and a transmitter configured to transmit a TPC report frame including the CST to the one source terminal.

Aspects of the present disclosure can minimize performance degradation according to a delay time in clear channel assessment (CCA) in order to adaptively control a CST.

Aspects of the present disclosure can increase frequency reuse by adaptively controlling the CST.

Aspects of the present disclosure can reduce frequency resources.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms or words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the description, it should be understood that the terms "include" or "have" indicate existence of a feature, a number, an operation, a structural element, parts, or a combination thereof, and do not previously exclude the existences or probability of addition of one or more another features, numeral, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Figure 1:
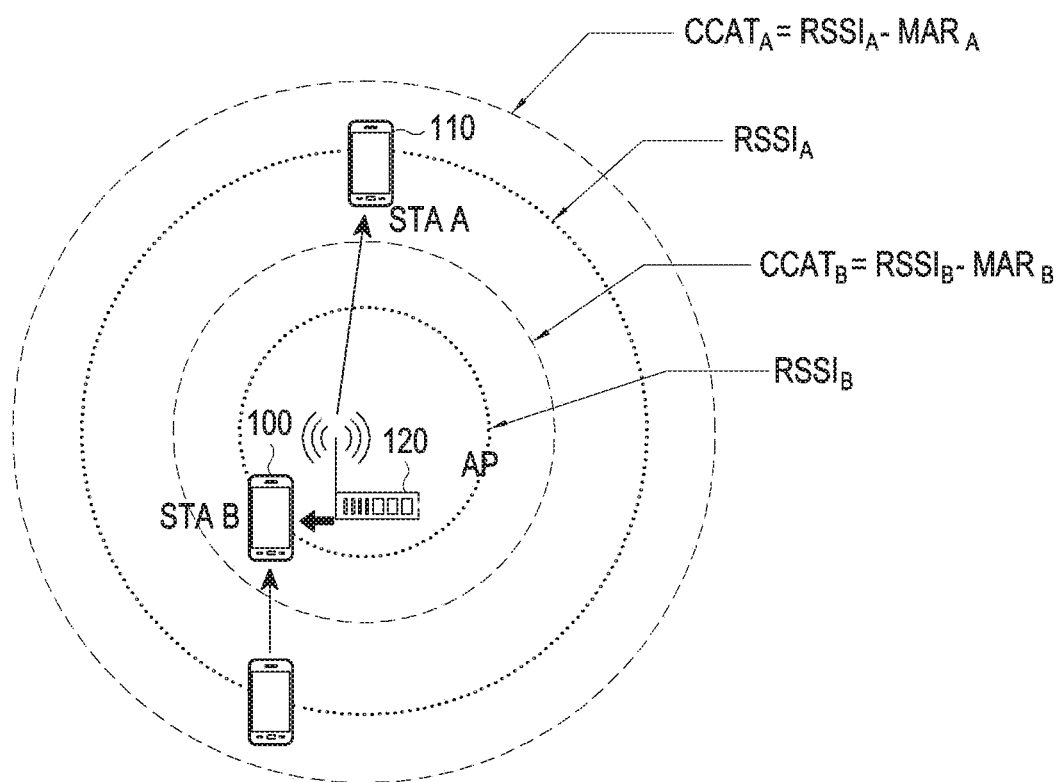
FIG. 1 illustrates an example of a method of determining a carrier sense threshold (CST) value in dynamic sensitivity control (DCS) according to an embodiment of the present disclosure.

FIG. 1 illustrates an example of a method of determining a carrier sense threshold (CST) value in dynamic sensitivity control (DCS) according to an embodiment of the present disclosure.

Referring to FIG. 1, it a network environment includes a destination terminal (STA B) 100, a destination terminal (STA B) 110, and an application processor (AP) 120.

In the DCS, the AP 120 configures a CST value based on a strength of a signal received from the destination terminal (STA A) 110 (clear channel assessment threshold ($CCAT_A$)=received signal strength indication ($RSSI_A$)–$MAR_A$). Here, a RSSI refers to a received signal strength, an MAR corresponds to 20 dB, and a CCAT and the CST can be used as the same meaning in the specification.

Further, in the DCS, the AP 120 configures the CST value based on a strength of a signal received from the destination terminal (STA B) 100 ($CCAT_B$=$RSSI_B$–$MAR_B$).

At this time, the AP 120 considers only a position of the destination terminal (STA B) 100 or the destination terminal (STA A) 110 without considering the interferer terminal. Further, imbalance between the AP 120 and the destination terminal (STA A) 110 or the destination terminal (STA B) 100 is not considered.

Figure 2:
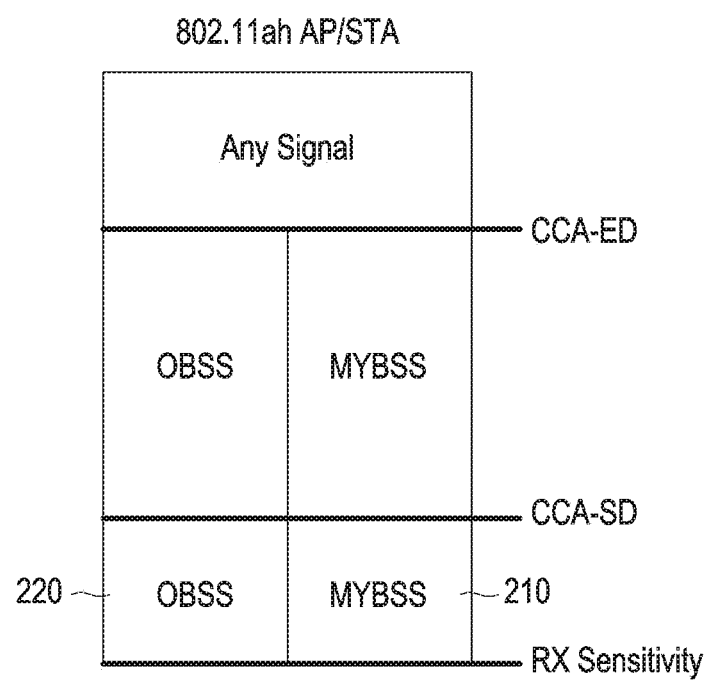
FIG. 2 illustrates an example of a method of determining a CST value according to a basic service set (BSS) according to an embodiment of the present disclosure.

FIG. 2 illustrates an example of a CST value determination method according to a basic service set (BSS) according to an embodiment of the present disclosure.

Referring to FIG. 2, different CST values are applied according to a MYBSS 210 and an overlapping BSS (OBSS) 220. At this time, a BSS color bit is used.

However, the BSS considers only whether a signal is transmitted from the MYBSS or the OBSS, without considering the destination terminal.

Figures 3, 4:
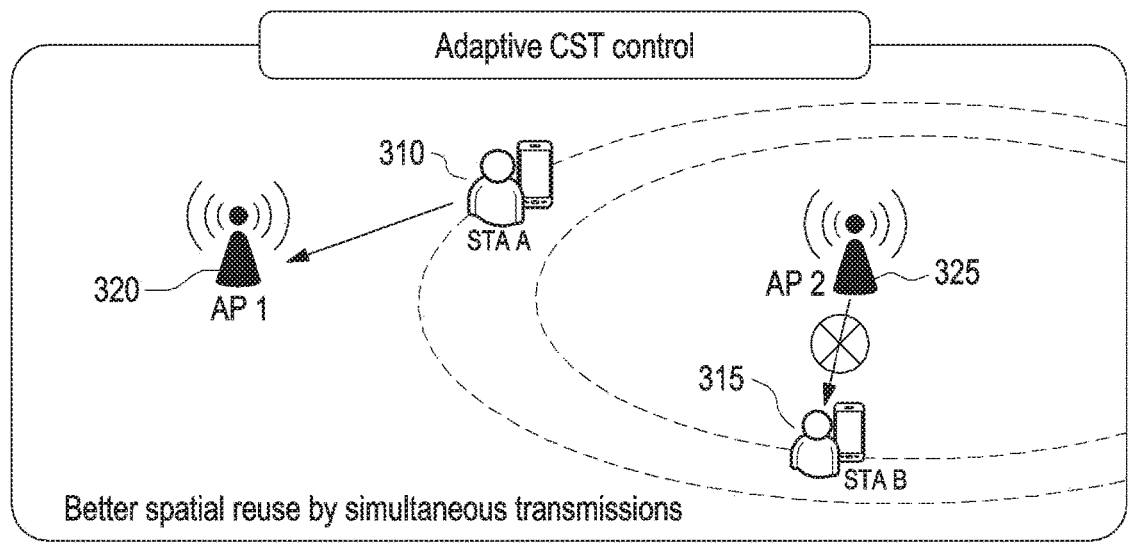
FIG. 3 illustrates an example of a method of determining a CST in a wireless communication system according to an embodiment of the present disclosure.
FIG. 4 illustrates a frame structure showing a BSS color bit according to an embodiment of the present disclosure.

FIG. 3 illustrates an example of a CST determination method in a wireless communication system according to an embodiment of the present disclosure.

Referring to FIG. 3, the wireless communication system according to an embodiment of the present disclosure includes AP #1 320, AP #2 325, STA A 310, and STA B 315.

According to an embodiment of the present disclosure, the CST value is determined according to each of the interferer terminal (STA A) 310 and the destination terminal (STA B) 315.

According to an embodiment of the present disclosure, it is possible to control transmission power (Tx power) based on the CST value.

According to an embodiment of the present disclosure, a CCA method (blind CCA and general CCA) when CCA and a destination during a time slot before an interferer is recognized are not determined is proposed.

According to an embodiment of the present disclosure, an overhead compensation method after the interferer is recognized is proposed.

FIG. 4 illustrates a frame structure showing a BSS color bit according to an embodiment of the present disclosure.

Referring to FIG. 4, in the wireless communication system according to an embodiment of the present disclosure, a BSS color bit is used to improve spatial reuse capability and protect a packet of a terminal within the same BSS.

A color bit indicating a BSS of the source is shown in a physical signal field (PHY SIG field).

For example, when there is an uplink bit, up or down of the uplink bit is indicated through a direction (DIR) field 430, and a BSS from which a signal is transmitted is identified through a color bit 410. When there is no uplink bit, the BSS from which the signal is transmitted may be identified through a color bit 420 without the DIR field 430.

Figures 5, 6:
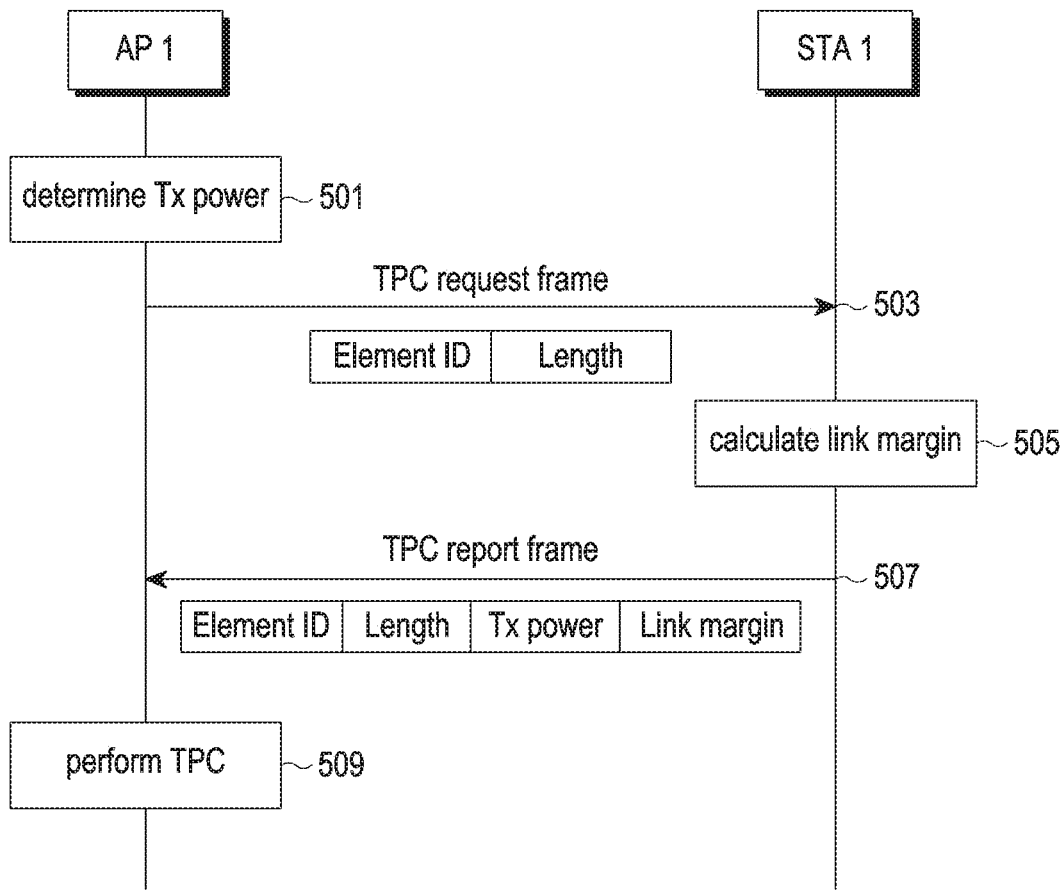
FIG. 5 is a flowchart illustrating a method of controlling transmission power according to an embodiment of the present disclosure.
FIG. 6 illustrates an example of a CST table according to an embodiment of the present disclosure.

FIG. 5 is a flowchart illustrating a transmission power control (TPC) method according to an embodiment of the present disclosure.

Referring to FIG. 5, in the present disclosure, AP #1 may be expressed by a source terminal, a source node, a source terminal i, or a source node i, and the STA may be expressed by a destination terminal, a destination terminal k, or a destination node k. Further, AP #2 may be expressed by an interferer terminal, an interferer node j, or an interferer terminal j.

In operation 501, AP #1 determines whether to control transmission power. AP #1 transmits a TPC request frame to a terminal (STA #1) in operation 503. The TPC request frame includes, for example, an element identification (ID) field, a length field, and the like. Thereafter, the terminal calculates a link margin in operation 505. The terminal (STA #1) transmits a TPC report frame to AP #1 in operation 507. The TPC report frame includes, for example, an element ID field, a length field, a Tx power field, a link margin field, and the like. The link margin field includes the link margin calculated in operation 505. The link margin according to an embodiment of the present disclosure is expressed by a ratio between a required signal to interference plus noise ratio (SINR) and a received SINR.

AP #1 performs the TPC based on the TPC report frame in operation 509.

The TPC corresponds to an operation defined in IEEE 802.11h. According a function corresponding to the TPC, when the source terminal (AP #1) which desires to control Tx power transmits a TPC request to the destination terminal (STA #1), the destination terminal (STA #1) calculates how much Tx power can be reduced (i.e., link margin) and transmits feedback through a TPC report action frame (TPC report frame). The destination terminal (STA #1) having received the TPC report frame calculates a link margin $\lambda_{k,m_{ref}}$ for the destination terminal and transmits the calculated link margin to the source terminal (AP #1) through the TPC report frame. $m_{ref}$ denotes a modulation coding scheme (MCS) used for transmitting the TPC request frame and the link margin is determined according to the MCS.

The source terminal having received the TPC report frame from the destination terminal k determines CST values for a target interferer terminal and destination terminal based on recorded interference strength ($I_{j \to i,ref}$) and feedback link margin $\lambda_{k,m_{ref}}$. A CST value $C_i(j,k)$ according to an embodiment of the present disclosure may be expressed by Equation 1 below.

$$C_i(j,k) \leftarrow I_{j \to i,ref} + \lambda_{k,m_{ref}}^j \quad \text{Equation 1}$$

As shown in Equation 1 above, a reason why the CST is configured as $C_i(j,k)$ is that, even though there is a signal larger than, by the link margin, an interference strength when the TPC request frame is transmitted, it is expected that the destination terminal k can still receive a signal of the source terminal i. This requires an assumption that a channel between the source terminal, the destination terminal, and the interferer terminal is not changed and, accordingly, when a change in the channel is detected or a particular time passes, an operation for transmitting the TPC request frame again to update the CST is needed. Such an operation may be performed in such a manner that the TPC request frame is broadcasted when there is no destination terminal or the TPC request frame is carried on a data frame (that is, piggyback) when data is transmitted when the interferer terminal exists.

When a CST value shown in a CST table 610 described below through FIG. 6 is controlled, the source terminal considers only whether the source terminal's own transmission is successful, so that interference may occur, that is, reception of a signal, which is already being transmitted, may be prevented. Accordingly, a fairness problem occurs and has a bad influence from a viewpoint of an overall network performance. An operation for reducing interference given to the OBSS through a decrease in Tx power when the CST is increased is defined as Equation 2

$$C_{i,PC}(j,k) \leftarrow I_{j \to i,ref} + \alpha \lambda_{k,m_{ref}}^j$$

$$P_i(j,k) \leftarrow P_{i,max} - (1-\alpha)\lambda_{k,m_{ref}}^j \quad \text{Equation 2}$$

In Equation 2, $P_i(j,k)$ denotes Tx power used when the source terminal i performs transmission to the destination terminal k simultaneously with transmission to the destination terminal k by the interferer terminal j. Some of the link margin is used for increasing the CST and the remainder of the link margin is used for decreasing the transmission power. $\alpha \in (0,1)$ denotes a parameter for determining how much less to increase the CST and further decrease the transmission power, considering another OBSS. As a $\alpha \in (0,1)$ is higher, the source terminal's own performance gain is more important. As $\alpha \in (0,1)$ is lower, fairness is considered important.

According to an embodiment of the present disclosure, the CST value is determined according to each of the interferer terminal (STA A) 310 and the destination terminal (STA B) 315.

FIG. 6 illustrates an example of a CST table according to an embodiment of the present disclosure.

Referring to FIG. 6, each terminal stores a CST table 610. The CST table is formed in a two dimensional matrix. Each column includes CST values used when transmission to particular destination terminals (for example, STA 1, 2, and 3) is performed and each row includes CST values used when transmission to particular interferer terminals (for example, AP 2, 3, and 4) is performed. CST values of the source terminal i for the interferer terminal j and the destination terminal k are expressed by $C_i(j,k)$. The values may be defined differently according to which MCS value is used for transmission to the destination terminal and, in this case, the CST table is formed in three dimensions. Hereinafter, it is assumed that only one MCS is used for the convenience of description.

Figure 7:
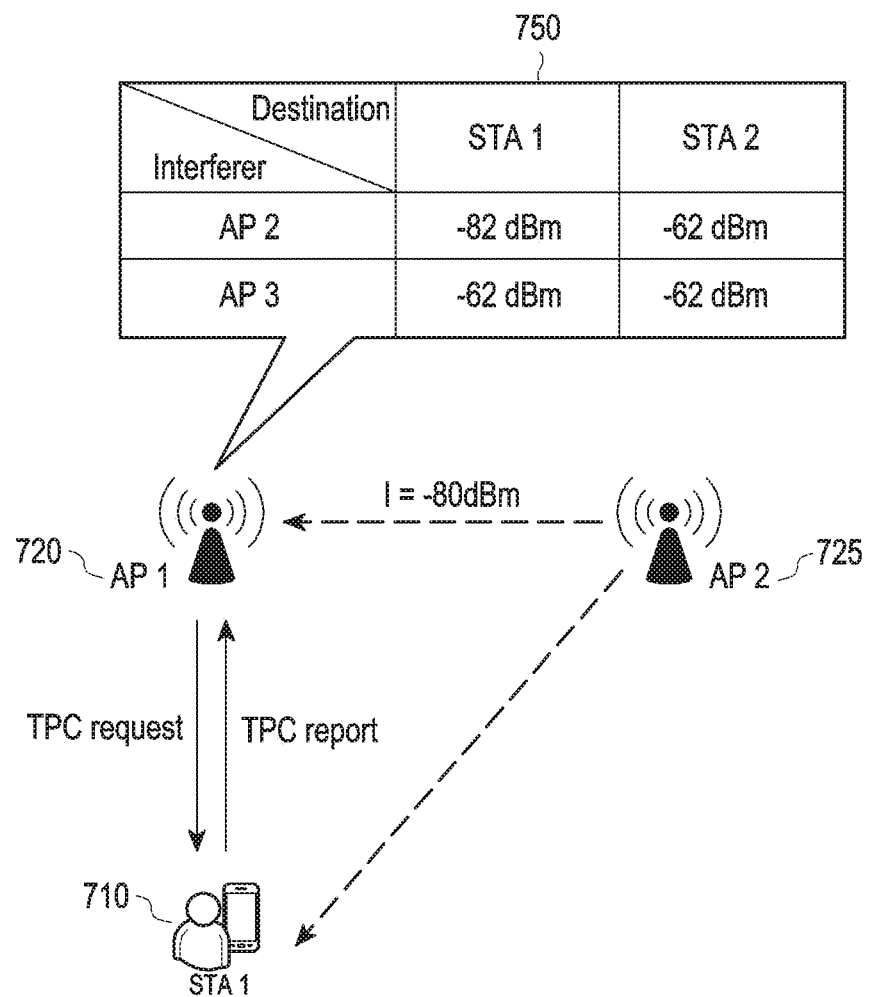
FIG. 7 illustrates an example of a method of configuring a CST value according to each of the interferer terminal and the destination terminal through interference recognition according to an embodiment of the present disclosure.

FIG. 7 illustrates an example of a method of configuring a CST value according to each of the interferer terminal and the destination terminal through interference recognition according to an embodiment of the present disclosure. FIG. 7 illustrates an example of a CST table 750.

Referring to FIG. 7, first, AP #1 720 configures CST values for the interferer terminal j and the destination terminal k (for example, STA #1 710 and STA #2) of the source terminal i as $C_i(j,k)$. $C_{max}^{OBSS}$, $\forall j,k$ is configured as $C_i(j,k)$. $C_{max}^{OBSS}$, $\forall j,k$ is a maximum value within a range of the CST value, which can be configured, and is to transmit the TPC request frame through an increase in the CST.

AP #1 720 detects AP #2 725 and STA #1 710 in a case of I<$C_1(2,1)$ (for example, I corresponds to −80 dBm). Then, AP #1 720 transmits the TPC request frame to STA #1 710.

STA #1 710 calculates the link margin and reports the link margin to AP #1 720 through the TPC report frame. When AP #1 720 receives the TPC report frame, $\lambda_1$ corresponds to, for example, 10 dB, and a signal strength of AP #2 corresponds to −80 dBm, $C_1(2, 1)$ becomes −70 dBm.

If AP #1 720 has not been received, then the TPC report frame, $C_1(2,1)$ is configured as $C_{min}^{OBSS}$. $C_{min}^{OBSS}$ is a minimum value within a range of the CST value which can be configured and is the same as a current default CST value.

Figure 8:
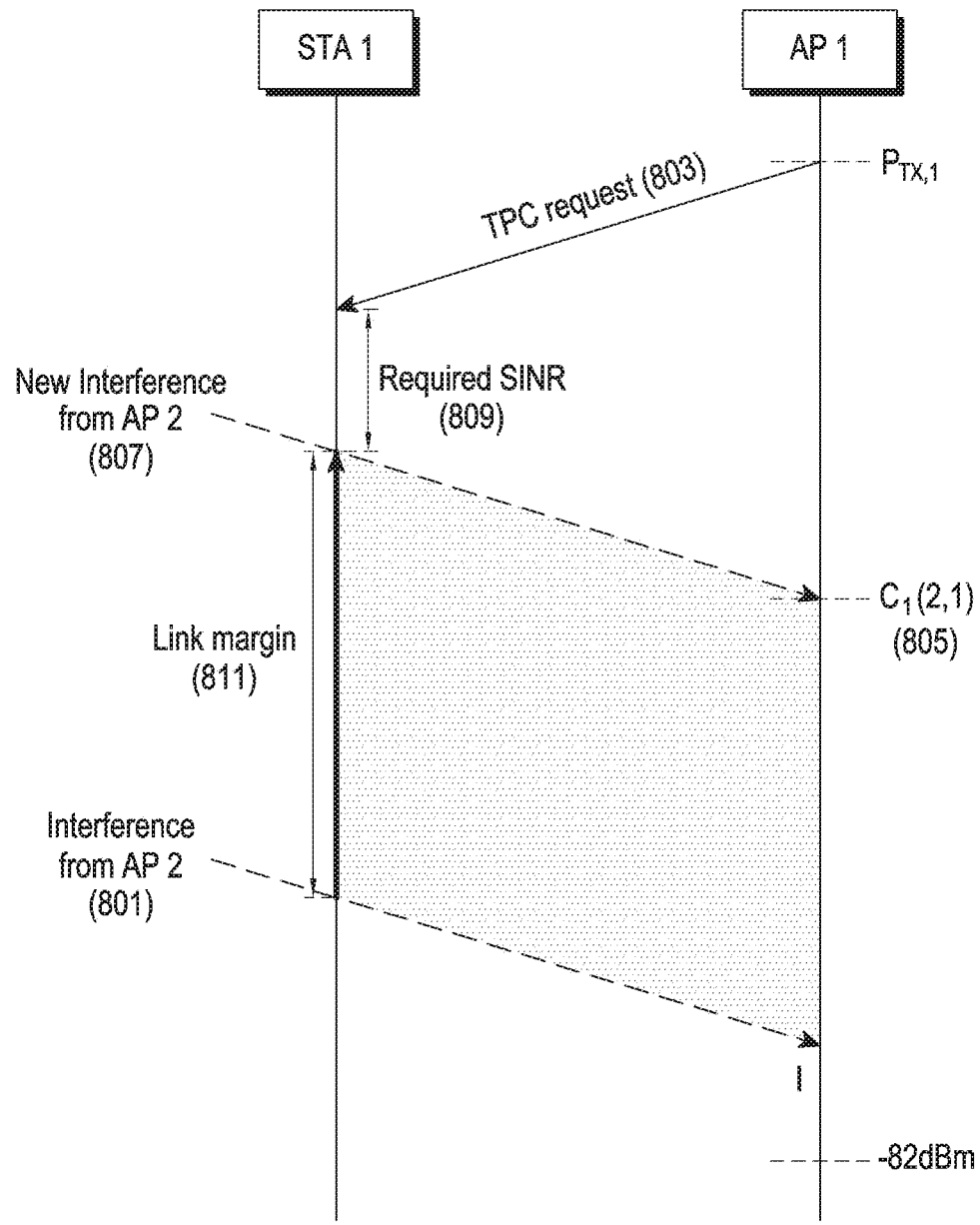
FIG. 8 illustrates an example of a method of controlling transmission power based on a CST value according to an embodiment of the present disclosure.

FIG. 8 illustrates an example of a TPC method according to a CST value according to an embodiment of the present disclosure.

Referring to FIG. 8, it is assumed that the operations are not performed chronologically. Further, y axes of STA #1 and AP #1 indicate a received signal strength. For example, a received signal strength 807 is higher than a received signal strength 801.

When an interferer is received from AP #2 as indicated by reference numeral 801 or when an interferer is measured from AP #2, AP #1 stores an interferer intensity (I) and transmits a TPC request frame to STA #1 as indicated by reference numeral 803. STA #1 calculates a link margin according to a ratio between a required SINR value 809 and a received SINR value and informs AP #1 of the calculated link margin. In operation 805, AP #1 configures (or determines) a CST value and a Tx power value based on the link margin and the I value of STA #1. As described above, when the CST value is configured (or determined), the required SINR value is guaranteed even though data is transmitted to STA #1 when the interferer having the same size of that of the CST value 807 is received.

For reference, reference numeral 809 of FIG. 8 indicates the required SINR value and reference numeral 811 indicates the link margin. Through addition of the link margin to the I value, the CST value ($C_1(2, 1)$) and the Tx power are configured.

Hereinafter, according to an embodiment of the present disclosure, a CCA method (blind CCA and general CCA), when CCA and destination during a time slot before an interferer is recognized are not determined, will be described.

In order to recognize the interferer by using physical layer convergence protocol (PLCP) header information on the interferer terminal by the source terminal, duration of tens of us or several time slots should elapse (for example, about 3 slots). During the time slots, the interferer cannot be recognized and thus the interferer terminal is not recognized, the time slot is named a "blind-slot" and CCA performed at this time is named "blind CCA". In the blind CCA, the CST value determined by the destination is used and an example thereof is shown in Equation 3 below.

$$C_i^*(k) = \min_j C_i(j, k) \quad \text{Equation 3}$$

Referring to Equation 3 above, a minimum value of the CST values which a particular destination terminal has with respect to all interferer terminals is used. Post backoff is performed after the source terminal performs transmission or backoff performed when the destination terminal does not exist since there is no packet in a queue is named general CCA. A CST value used at this time is shown in Equation 4 below.

$$\hat{C}_i(k) = \min_k C_i^*(k) \quad \text{Equation 4}$$

When the destination terminal does not exist, the CST value is configured as the minimum value of the CST values used in blind CCA of all destination terminals. Alternatively, the CST value of the general CCA is configured as receiver sensitivity, that is, a value as small as possible and accordingly, when a new terminal is added to the network, information on the terminal may be collected.

Hereinafter, according to an embodiment of the present disclosure, an overhead compensation method after the interferer is recognized will be described.

When interference intensity is smaller than $C_i(j,k)$ and larger than $C^*_i(k)$, it is not possible to reduce a backoff counter (BC) during the blind-slot. In this case, even though the BC could be decreased, the BC has not been decreased since the interferer was not recognized. Accordingly, a plurality of BCs can be decreased at once to minimize time overhead after the interferer is recognized. The BC can be decreased by comparing the interference signal intensity after interferer recognition with CST values before and after the recognition. Further, the BC can be decreased by the number of time slots (during the blind-slot) spent on the interferer recognition. The BC can also be decreased by a predetermined integer between 0 and the number of time slots (during the blind-slot) spent on the interferer recognition.

An embodiment of the present disclosure defines each of the full compensation of also decreasing the BC, which has not been decreased during the blind-slot, and the random compensation of decreasing the predetermined number smaller than the number decreased by the full compensation. In a case of the random compensation, it is possible to reduce collision which may be generated while a plurality of OBSSs perform compensation at the same time.

Figure 9:
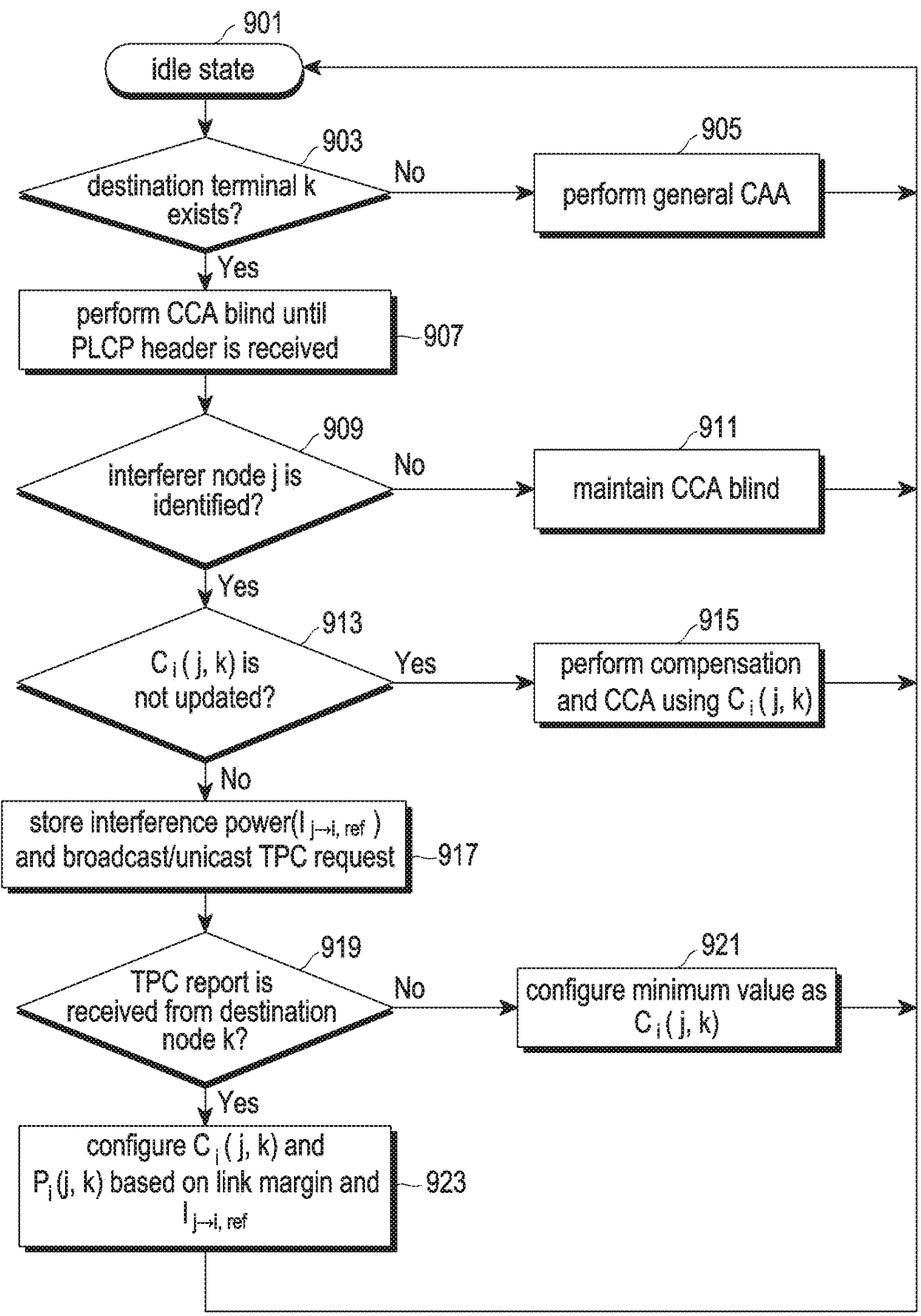
FIG. 9 is a flowchart illustrating the operation of a source terminal according to an embodiment of the present disclosure.

FIG. 9 is a flowchart illustrating the operation of the source terminal according to an embodiment of the present disclosure.

Referring to FIG. 9, in operation 901, the source terminal is in an idle state. In operation 903, the source terminal determines whether a destination terminal k exists. When the destination terminal k does not exist, the source terminal performs general CCA in operation 905. However, when the destination terminal k exists, the source terminal performs CCA blind until a PLCP header is received in operation 907.

The source terminal identifies who the interferer node is in operation 909. For example, the source terminal identifies whether an interferer node j exists. When the interferer node j does not exist, the source terminal maintains the CCA blind operation in operation 911. However, when the interferer node j exists, the source terminal determines whether $C_i(j,k)$ is not updated in operation 913. When $C_i(j,k)$ is updated, the source terminal performs compensation and CCA using $C_i(j,k)$ in operation 915. However, when is not updated, the source terminal stores interference power and broadcasts or unicasts a TPC request frame in operation 917.

The source terminal determines whether a TPC report frame is received from the node k in operation 919. When the TPC report frame is not received from the node k, the source terminal configures $C_i(j,k)$ as a minimum value in operation 921. However, when the TPC report frame is received from the node k, the source terminal configures $C_i(j,k)$ and $P_i(j,k)$ based a link margin and $I_{j \to i, ref}$ in operation 923.

Figure 10:
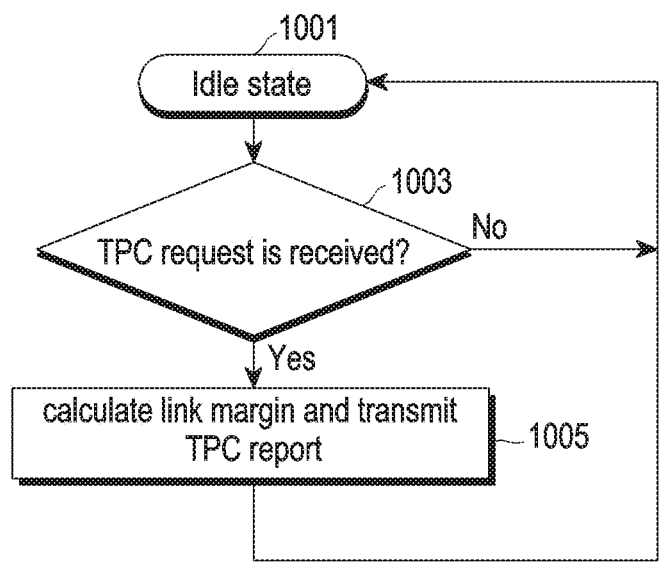
FIG. 10 is a flowchart illustrating the operation of a destination terminal according to an embodiment of the present disclosure.

FIG. 10 is a flowchart illustrating the operation of a destination terminal according to an embodiment of the present disclosure.

Referring to FIG. 10, in operation 1001, the destination terminal is in an idle state. In operation 1003, the destination terminal receives a TPC request frame from the source terminal. In operation 1005, the destination terminal calculates a link margin and transmits the TPC report frame to the source terminal while the link margin is inserted into the TPC report frame. The link margin according to an embodiment of the present disclosure is expressed by a ratio between a required SINR and a received SINR.

Figure 11:
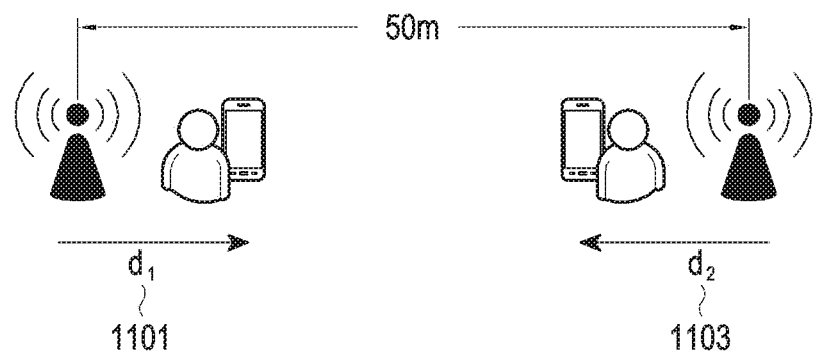
FIG. 11 illustrates an example of a method of controlling a CST value based on a position of a station (STA) according to an embodiment of the present disclosure.

FIG. 11 illustrates an example of a method of controlling a CST value based on a position of the STA according to an embodiment of the present disclosure.

Referring to FIG. 11, when STAs are located with distances $d_1$ 1101 and $d_2$ 1103 from two APs, which are separated from each other with 50 m therebetween, sum throughput (Sum Tput) and minimum throughput (Min. Tput) are changed by adaptively controlling the CST value according to a combination ($d_1$, $d_2$) of the locations of the STAs. According to an embodiment of the present disclosure, it is possible to significantly improve throughput by increasing frequency reuse in an environment where a plurality of adjacent BSSs use the same frequency channel. Further, according to an embodiment of the present disclosure, fairness of the overall network can be considered as well as a throughput gain by controlling transmission power.

Such a result may be identified through FIGS. 12A to 12H.

FIGS. 12A to 12H illustrate graphs showing sum throughput and minimum throughput according to each STA position in a two-cell environment according to various embodiments of the present disclosure.

Referring to FIGS. 12A to 12H, a result drawn through a simulation is illustrated, showing which Sum Tput and Min. Tput are obtained according to the combination ($d_1$, $d_2$) of the locations of the STAs when the STAs are located with the distances $d_1$ 1101 and $d_2$ 1103 from the two APs, which are separated from each other with 50 m therebetween. FIGS. 12A to 12D illustrates Sum Tput and FIGS. 12E to 12H illustrate Min. Tput in a two-cell environment.

Figure 12A:
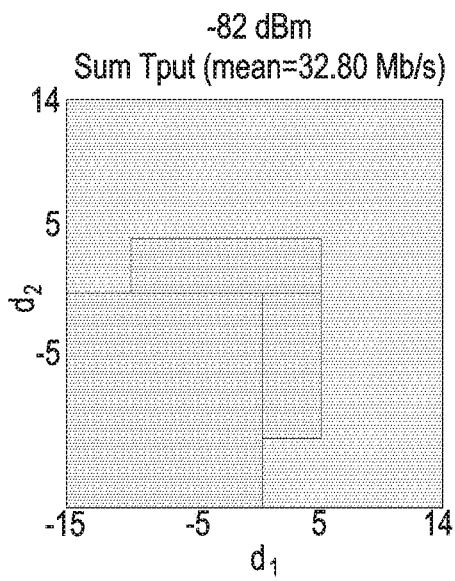
FIGS. 12A to 12H illustrate graphs showing sum throughput and minimum throughput according to each STA position in two-cell environment according to various embodiments of the present disclosure.
Figure 12B:
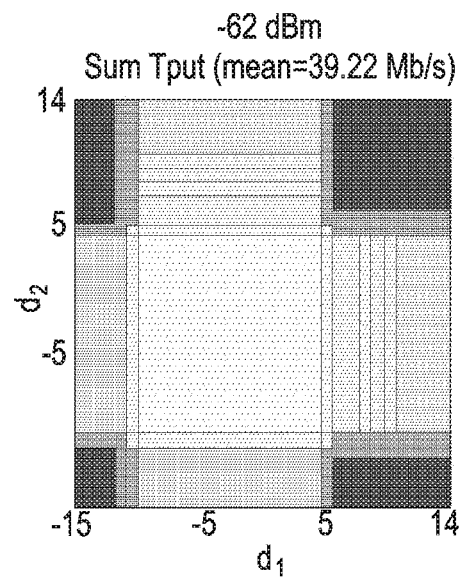
Figure 12C:
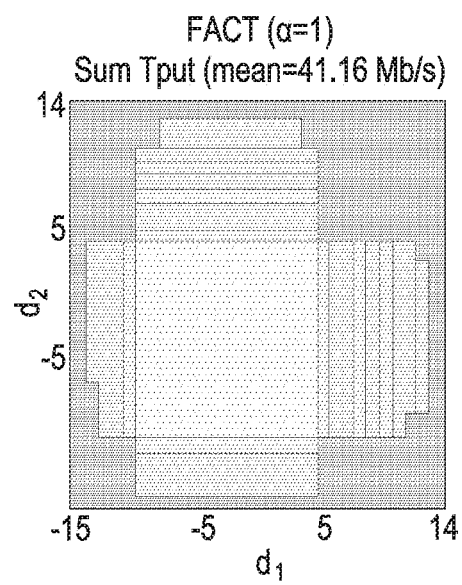
Figure 12D:
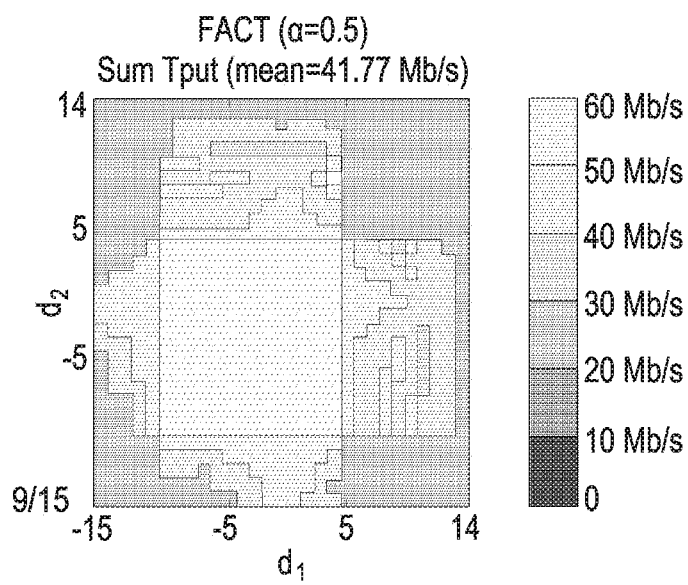
Figure 12E:
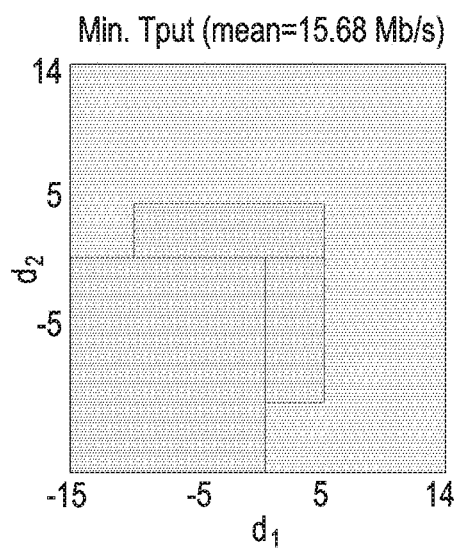
Figure 12F:
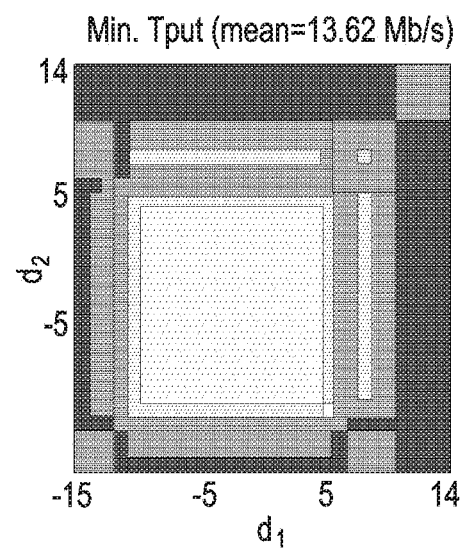
Figure 12G:
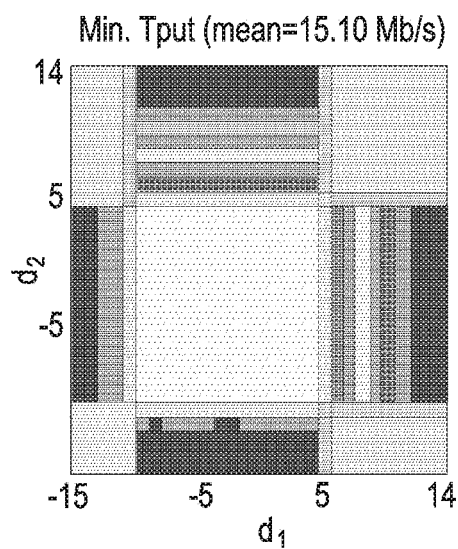
Figure 12H:
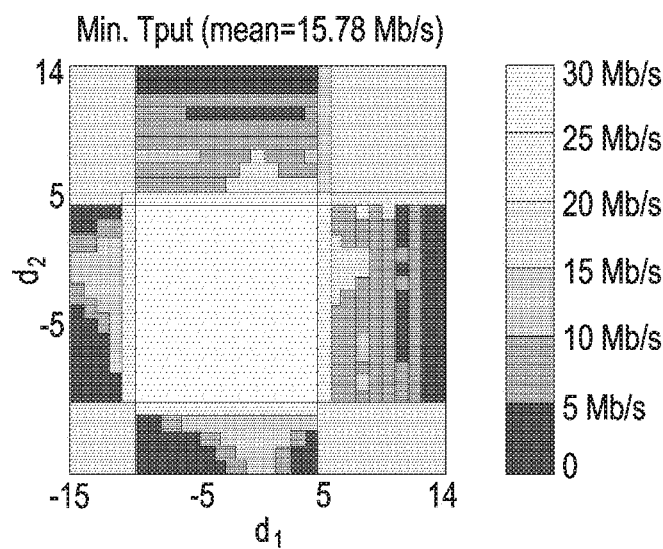

Referring to FIGS. 12A to 12H, compared to two cases (FIG. 12B) in which the CST is fixed to a predetermined value, an operation according to the present disclosure (FIG. 12C) named FACT ($\alpha=1$) can reduce collision by adaptively recognizing a case in which a frequency can be reused to obtain a performance gain and also not transmitting when the frequency reuse is not possible. Further, when TPC is also used ($\alpha=0.5$) (FIG. 12D), the OBSS is protected, and a greater performance gain in Min. Tput is obtained (FIG. 12H).

Figure 13:
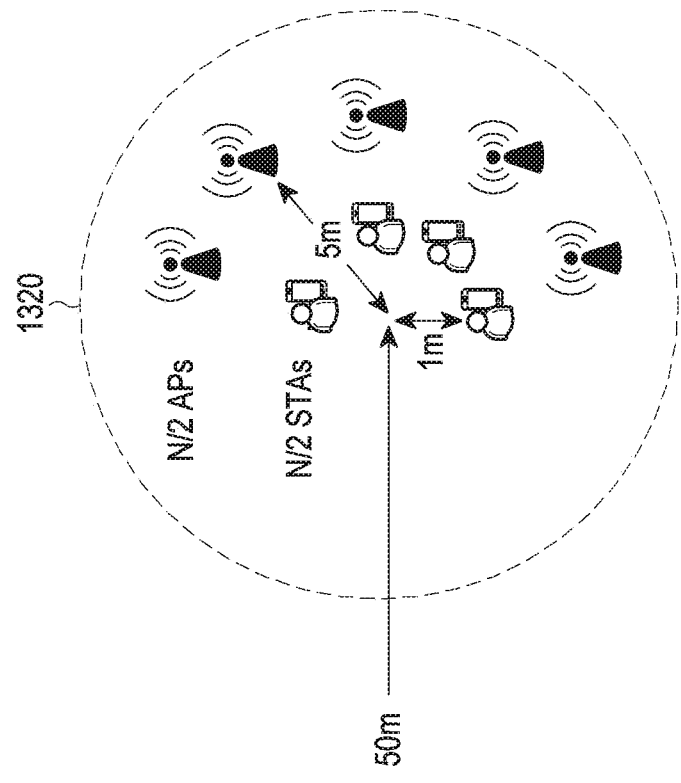
FIG. 13 illustrates blind clear channel assessment (CCA), general CCA, and compensation when a distance between two BSSs is 50 m according to an embodiment of the present disclosure.
Figure 13:
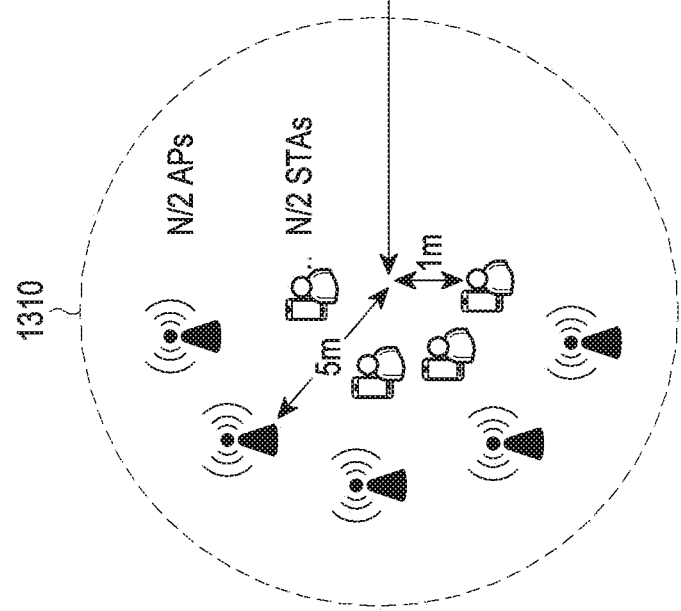
Figure 14A:
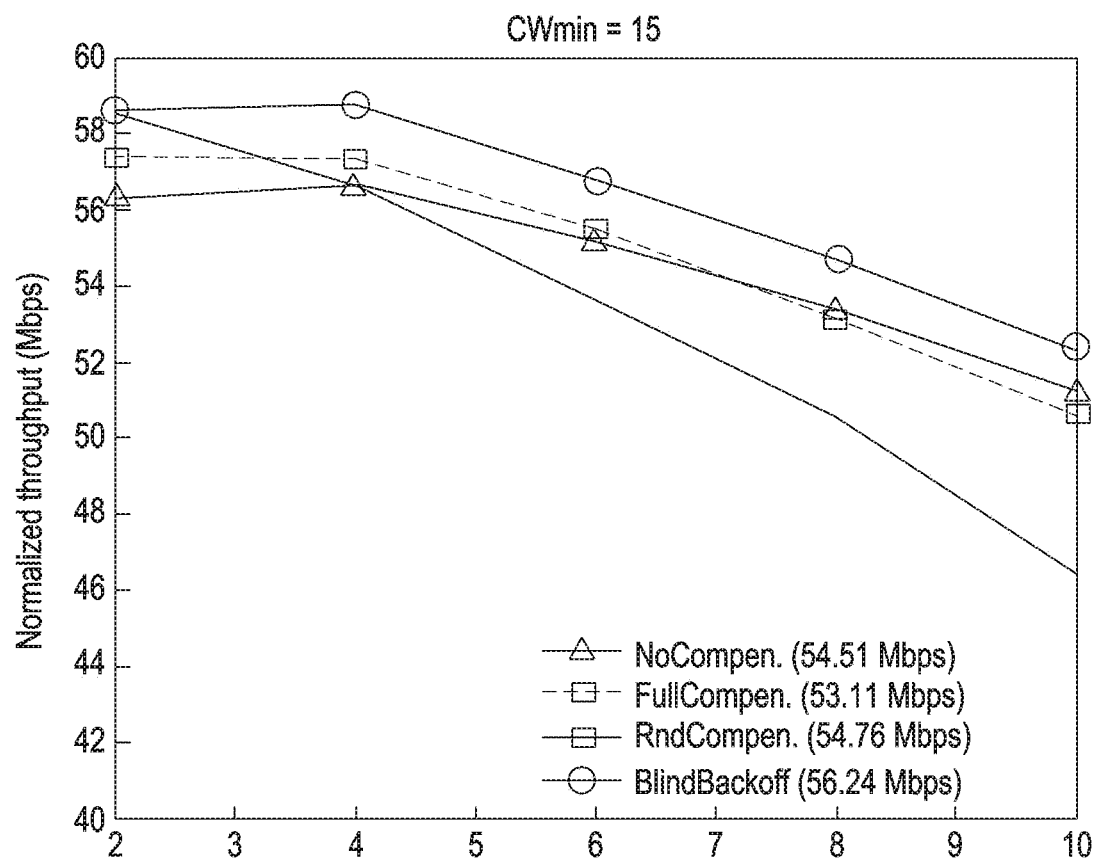
FIGS. 14A to 14D illustrate graphs showing total throughput according to a compensation scheme in an environment where cells of two groups adjacent to each other exists and the cells simultaneously attempt transmission after interferer node recognition according to various embodiments of the present disclosure.
Figure 14B:
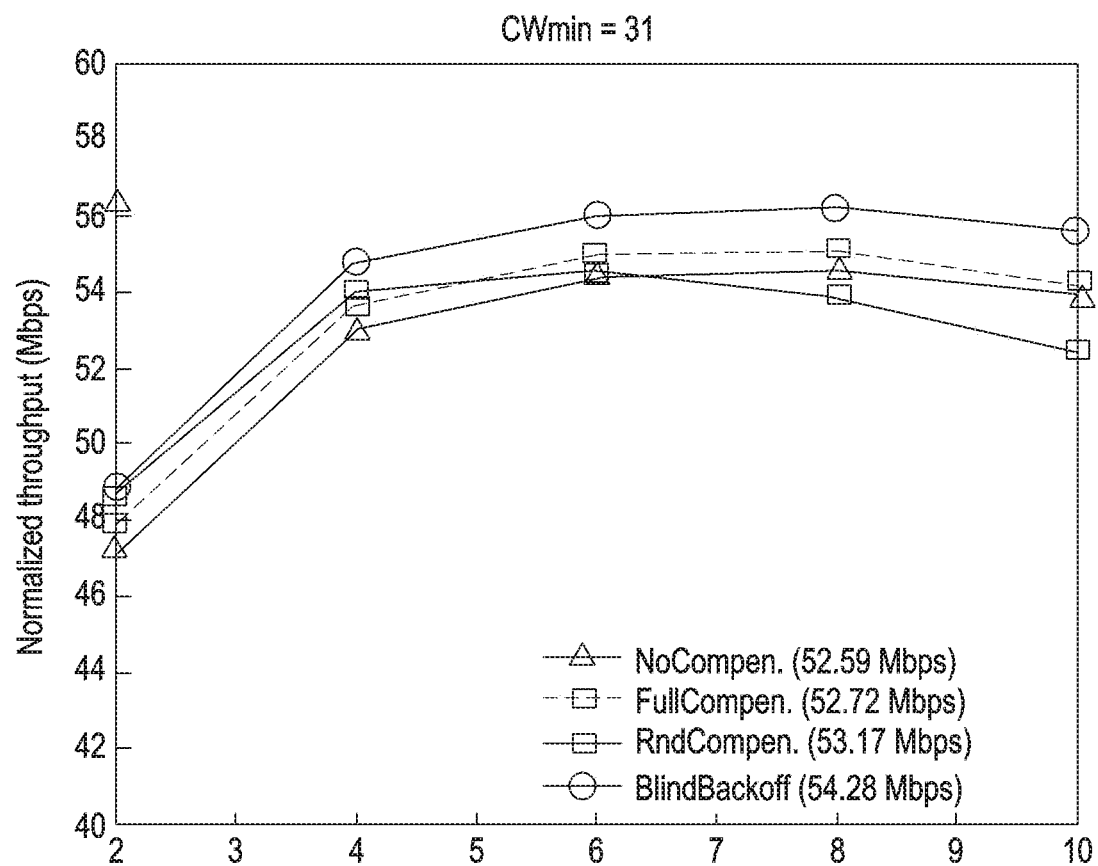
Figure 14C:
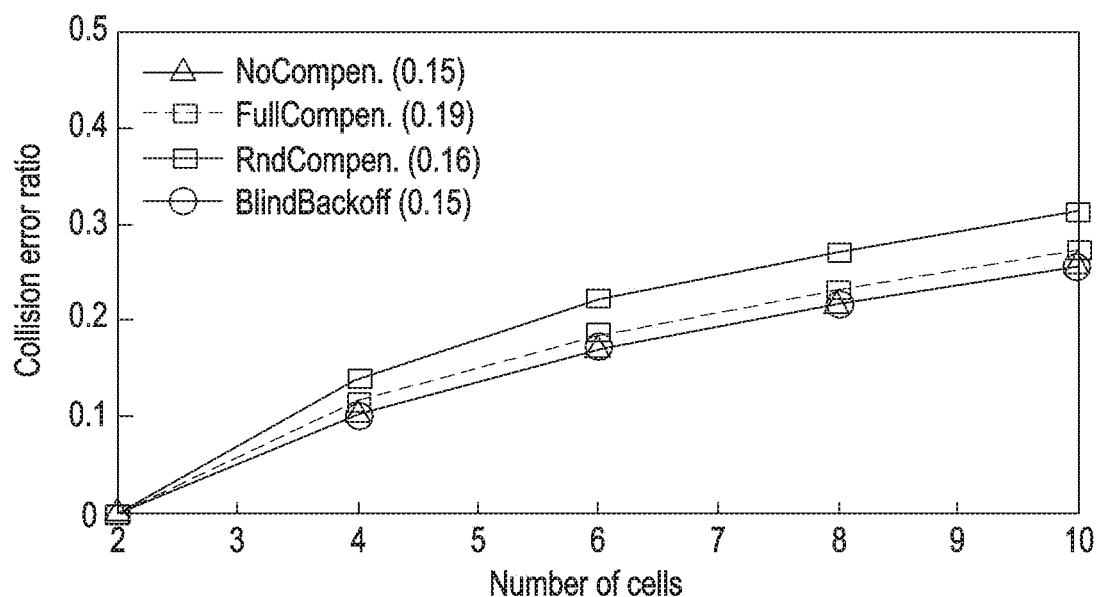
Figure 14D:
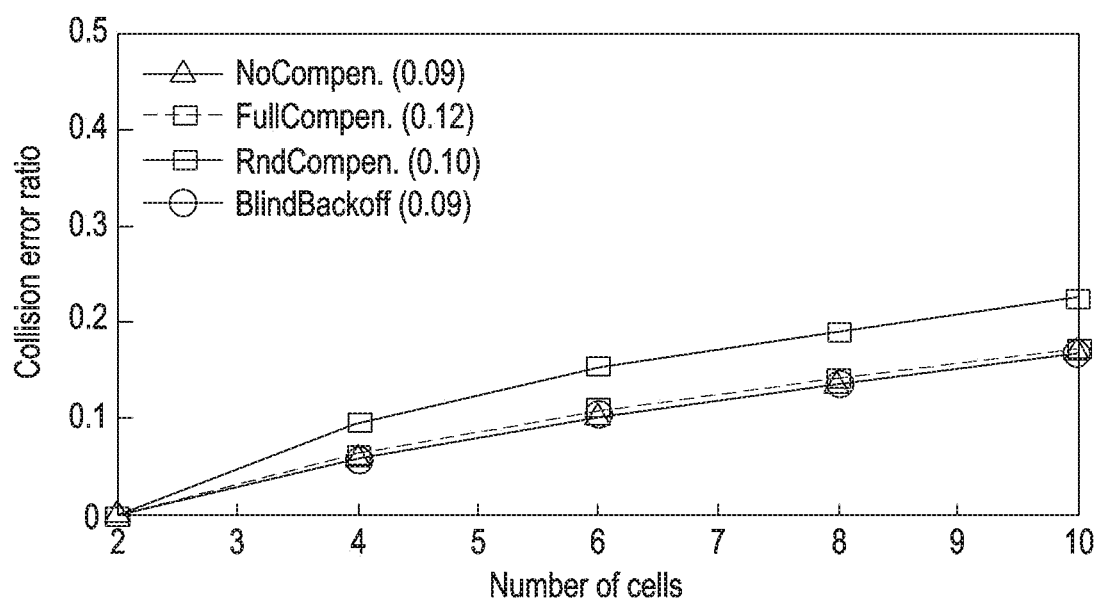

FIG. 13 illustrates blind CCA, general CCA, and compensation when a distance between two BSSs is 50 m according to an embodiment of the present disclosure.

Referring to FIG. 13, in a case of a topology (cells of two groups 1310 and 1320 adjacent to each other) of FIG. 13, four schemes below may be applied. Performances of the four schemes are described through FIGS. 14A to 14D.

1. Scheme having no compensation (scheme according to the related art)
2. Scheme having maximum compensation (for example, 3 slots)
3. Scheme having compensation corresponding to a predetermined value from 0 slot to 3 slots.
4. Scheme using a high CST value in advance even before interferer node recognition In the 4$^{th}$ scheme, the CST value to be used before the interferer node recognition is determined based on CST values for all interferer nodes. In a case of the topology of FIG. 13, there is no overhead for adaptive CST application.

Further, the blind CCA is performed with a minimum value of the CST values for all interferer nodes even in a state where the interferer node is not recognized, so that the BC is decreased in advance and thus an additional gain of throughput may be obtained. The compensation also may decrease time overhead required for the interferer recognition and thus obtain a performance gain. The performance gain is noticeable when the size of a packet is small or an MCS is high and thus the time overhead further influences the throughput. The performance gain according to an embodiment of the present disclosure may be identified through FIGS. 14A to 14D.

FIGS. 14A to 14D illustrate graphs showing total throughput according to a compensation scheme in an environment including cells of two groups adjacent to each other and the cells simultaneously attempt transmission after interferer node recognition according to an embodiment of the present disclosure.

Referring to FIGS. 14A to 14D, a method of decreasing the BC in advance by using the blind CCA (BlindBackoff) further improves throughput compared to the method of the related art (No compensation). The improvement width is larger in a case where the size of the packet is small compared to a case where the size of the packet is large. Similarly, the throughput is improved through the compensation, but in a case of full compensation, when the number of cells is larger, a collision error ratio increases and thus performance deteriorates. In contrast, in a case of random compensation, collision similar to that of the case where compensation is not performed occurs and the performance gain is obtained. Such an effect is noticeable when the size of a contention window (CW) is large.

Lastly, a CST adaptation operation according to an embodiment of the present disclosure does not require a new frame structure or a standard function but uses the defined or proposed operation of the related art, so that Wi-Fi devices, which are used on the current market, may simply implement the operation through a firmware upgrade, which corresponds to a very big merit coexisting with existing devices.

Figure 15:
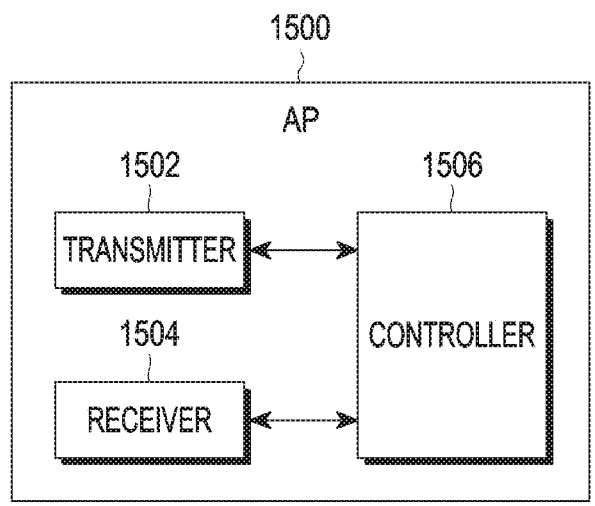
FIG. 15 is a block diagram of an application processor (AP) according to an embodiment of the present disclosure.

FIG. 15 is a block diagram of an AP according to an embodiment of the present disclosure.

Referring to FIG. 15, the AP includes a transmitter 1502, a receiver 1504, and a controller 1506.

The transmitter 1502 transmits a TPC request frame to a terminal.

The receiver 1504 receives a TPC report frame including a link margin.

The controller 1506 configures $PC_i(j,k)$ and $P_i(j,k)$ and based on the link margin and $I_{j \to i, ref}$. The link margin according to an embodiment of the present disclosure is expressed by a ratio between a required SINR and a received SINR.

The controller 1506 configures a receiver sensitivity value as a CST value used in a state where there is no destination and performs the CCA during the time slot before interferer recognition and the CCA method in a case where the destination is not determined (blind CCA & general CCA). The controller 1506 may determine the CST value to be used in a state where the interferer is not recognized based on CST values for all interferers. The controller 1506 may determine a minimum value of the CST values for all interferers as the CST value to be used in the state where the interferer is not recognized. The controller 1506 may determine the CST value to be used where there is no destination based on CST values for a combination of all interferers and the destination. The controller 1506 may determine a minimum value of the CST values for the combination of all interferers and the destination as the CST value to be used where there is no destination. The controller 1506 may determine the receiver sensitivity value as the CST value to be used in the state where there is not destination.

The controller 1506 performs compensation after the interferer recognition in an embodiment of the present disclosure. After the interferer recognition, the controller 1506 may compare the interference signal intensity with CST values before and after the recognition to decrease a BC, may decrease the BC by the number of time slots spent on the interferer recognition, or may decrease the BC by a predetermined integer between 0 and the number of time slots spent on the interferer recognition.

Figure 16:
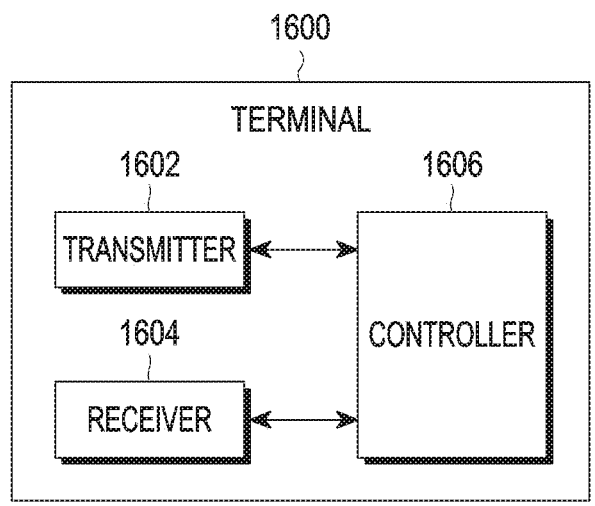
FIG. 16 is a block diagram of a terminal according to an embodiment of the present disclosure.

FIG. 16 is a block diagram illustrating a terminal according to an embodiment of the present disclosure.

Referring to FIG. 16, the terminal includes a transmitter 1602, a receiver 1604, and a controller 1606.

The receiver 1604 receives a TPC request frame from the AP.

The transmitter 1602 transmits a TPC report frame including a calculated link margin.

The controller 1606 calculates the link margin. The link margin according to an embodiment of the present disclosure is expressed by a ratio between a required SINR and a received SINR.

A method and an apparatus for determining a CST in a wireless communication system according to an embodiment of the present disclosure can be implemented in the form of hardware, software, or a combination thereof. Any such software may be stored, for example, in a volatile or non-volatile storage device such as a read-only memory (ROM), a memory such as a random access memory (RAM), a memory chip, a memory device, or a memory integrated chip (IC), or a recordable optical or magnetic medium such as a compact disc (CD), a digital versatile disc (DVD), a magnetic disk, or a magnetic tape, regardless of its ability to be erased or its ability to be re-recorded. A method of determining a CST in a wireless communication system according to an embodiment of the present disclosure may be implemented by a computer or portable terminal including a controller and a memory, and the memory is one example of a program including instructions for realizing the various embodiments of the present disclosure or a machine-readable storage medium suitable for storing programs.

Accordingly, the present disclosure includes a program including a code for implementing the apparatus and method described in the appended claims of the specification and a machine (computer or the like)-readable storage medium for storing the program.

An apparatus for determining a CST in a wireless communication system according to an embodiment of the present disclosure may receive the program from a program providing apparatus connected to the apparatus wirelessly or through a wire and store the received program. The program providing apparatus may include a program including instructions to allow a program processing apparatus to perform a method of determining a CST in a preset wireless communication system, a memory for storing information required for the method of determining the CST in the wireless communication system, a communication unit for performing wired or wireless communication with the program processing apparatus, and a controller for transmitting the corresponding program to a transmission/reception apparatus automatically or according to a request from the program processing apparatus.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of determining a carrier sense threshold by a source terminal in a wireless communication system, the method comprising:
    identifying whether two or more interferer terminals and two or more destination terminals exist for the source terminal;
    receiving two or more interference intensity values from the two or more interferer terminals;
    receiving one or more feedback link margin values from the two or more destination terminals;
    obtaining a plurality of first carrier sense thresholds corresponding respectively to a plurality of combinations between each of the two or more interferer terminals and each of the two or more destination terminals, based on the two or more interference intensity values and the one or more feedback link margin values; and
    adjusting transmission power of the source terminal based on the plurality of first carrier sense thresholds,
    wherein the plurality of first carrier sense thresholds are different from each other.

2. The method of claim 1, wherein each of the one or more feedback link margin values is determined according to a ratio between a required received signal strength and an actual received signal strength.

3. The method of claim 1, wherein the plurality of first carrier sense thresholds are determined differently according to one of a modulation coding scheme (MCS) and a channel status.

4. The method of claim 1, wherein the transmission power is a power of a signal transmitted from the source terminal to the two or more destination terminals.

5. The method of claim 1, wherein a second carrier sense threshold to be used in a state where one of the two or more interferer terminals is not identified, is determined based on carrier sense thresholds for all interferer terminals.

6. The method of claim 5, wherein the second carrier sense threshold to be used in the state where the one of the two or more interferer terminals is not identified, is determined as a minimum value of the carrier sense thresholds for all the interferer terminals.

7. The method of claim 6, wherein a third carrier sense threshold to be used in a state where a third one of the two or more destination terminals is not identified, is determined based on carrier sense thresholds for combinations between all the interferer terminals and other destination terminals.

8. The method of claim 7, wherein the third carrier sense threshold to be used in the state where the third one of the two or more destination terminals is not identified, is determined as a minimum value of the carrier sense thresholds for the combinations between all the interferer terminals and the other destination terminals.

9. The method of claim 1, further comprising:
    comparing an interference signal strength with carrier sense thresholds before interference is recognized;
    comparing the interference signal strength with carrier sense thresholds after interference is recognized in a state where the two or more interferer terminals are identified; and
    controlling a backoff counter according to a result of the comparison.

10. The method of claim 9, wherein the backoff counter is decreased by a number of time slots spent on interferer recognition or by a predetermined integer between 0 and the number of time slots spent on the interferer recognition.

11. A source terminal for determining a carrier sense threshold in a wireless communication system, the source terminal comprising:
    a communication interface; and
    at least one processor configured to:
        identify whether two or more interferer terminals and two or more destination terminals exist for the source terminal,
        receive, through the communication interface, two or more interference intensity values from the two or more interferer terminals,
        receive, through the communication interface, one or more feedback link margin values from the two or more destination terminals,
        obtain a plurality of first carrier sense thresholds corresponding respectively to a plurality of combinations between each of the two or more interferer terminals and each of the two or more destination terminals based on two or more interference intensity values and the one or more feedback link margin values, and
        adjust transmission power of the source terminal based on the plurality of first carrier sense thresholds, wherein the plurality of first carrier sense thresholds are different from each other.

12. The source terminal of claim 11, wherein each of the one or more feedback link margin values is determined according to a ratio between a required received signal strength and an actual received signal strength.

13. The source terminal of claim 11, wherein the plurality of first carrier sense thresholds are determined differently according to one of a modulation coding scheme (MCS) and a channel status.

14. The source terminal of claim 11, wherein the transmission power is a power of a signal transmitted from the source terminal to the two or more destination terminals.

15. The source terminal of claim 11, wherein a second carrier sense threshold to be used in a state where one of the two or more interferer terminals is not identified, is determined based on carrier sense thresholds for all interferer terminals.

16. The source terminal of claim 15, wherein the second carrier sense threshold to be used in the state where the one of the two or more interferer terminals is not identified, is determined as a minimum value of the carrier sense thresholds for all the interferer terminals.

17. The source terminal of claim 16, wherein a third carrier sense threshold to be used in a state where a third one of the two or more destination terminals is not identified, is determined based on carrier sense thresholds for combinations between all the interferer terminals and other destination terminals.

18. The source terminal of claim 17, wherein the third carrier sense threshold to be used in the state where the third one of the two or more destination terminals is not identified, is determined as a minimum value of the carrier sense thresholds for the combinations between all the interferer terminals and the other destination terminals.

19. The source terminal of claim 11, wherein the at least one processor is further configured to:
   compare an interference signal intensity with carrier sense thresholds before interference is recognized,
   compare the interference signal intensity with carrier sense thresholds after interference is recognized in a state where the two or more interferer terminals are not identified, and
   control a backoff counter according to a result of the comparison.

20. The source terminal of claim 19, wherein the backoff counter is decreased by a number of time slots spent on interferer recognition or by a predetermined integer between 0 and the number of time slots spent on the interferer recognition.

* * * * *